US012758884B2

(12) United States Patent
Damon

(10) Patent No.: US 12,758,884 B2
(45) Date of Patent: Oct. 13, 2026

(54) SYSTEM FOR INTEGRATING PHYSICAL AND ELECTRONIC SPORTS

(71) Applicant: Albert Damon, Bangkok (TH)

(72) Inventor: Albert Damon, Bangkok (TH)

( * ) Notice: Subject to any disclaimer, the term of this patent is extended or adjusted under 35 U.S.C. 154(b) by 185 days.

(21) Appl. No.: 18/719,230

(22) PCT Filed: Mar. 21, 2022

(86) PCT No.: PCT/TH2022/000010
§ 371 (c)(1),
(2) Date: Jun. 12, 2024

(87) PCT Pub. No.: WO2023/182946
PCT Pub. Date: Sep. 28, 2023

(65) Prior Publication Data

US 2025/0065234 A1 Feb. 27, 2025

(51) Int. Cl.
*A63F 13/812* (2014.01)
*A63F 13/28* (2014.01)
*A63F 13/65* (2014.01)

(52) U.S. Cl.
CPC ............ *A63F 13/812* (2014.09); *A63F 13/28* (2014.09); *A63F 13/65* (2014.09); *A63F 2300/8094* (2013.01)

(58) Field of Classification Search
CPC ............ A63B 71/0622; A63B 71/0669; A63B 2225/50; A63B 2225/54; A63B 2225/20;
(Continued)

(56) References Cited

U.S. PATENT DOCUMENTS 5,080,375 A * 1/1992 Moosavi .............. A63B 63/004 473/478
5,562,288 A * 10/1996 Erkebaev ........... A63B 69/0097 273/400

(Continued)

FOREIGN PATENT DOCUMENTS

JP 2022-027222 A 2/2022

OTHER PUBLICATIONS

WIPO, Korean International Search Authority, International Search Report and Written Opinion mailed Dec. 12, 2022 in International Patent Application No. PCT/TH2022/000010, 7 pages.

*Primary Examiner* — Carl V Larsen

(57) ABSTRACT

A system for a hybrid electronic and physical sporting experience includes a physical playing environment (500) for a pair of teams to play a physical sport, a sporting object for playing the physical sport within the physical playing environment, at least two electronic game controllers each of the two electronic game controllers associated with one of the teams, and a display board. Components of the physical playing environment modified to receive electronic communication from the electronic game controllers may include at least one goal (240), and a lighting system (290). At least two of the electronic game controllers allows electronic sport team members to send instructions to modify at least one of the components of the playing environment. The display board receives electronic communication from the electronic game controllers and displays a status of the hybrid electronic and physical sporting experience.

15 Claims, 8 Drawing Sheets

(58) Field of Classification Search
CPC ........ A63F 13/27; A63F 13/65; A63F 13/812; A63F 13/28; A63F 2300/8094; A63F 7/06; A63F 7/0616; A63F 2009/2451; A63F 2009/2463; A63F 2009/247; A63F 2011/009; A63F 13/23; A63F 7/30
See application file for complete search history.

(56) References Cited

U.S. PATENT DOCUMENTS

| | | | | |
|---|---|---|---|---|
| 9,143,828 | B2 * | 9/2015 | Inselberg | H04W 84/00 |
| 9,751,018 | B2 * | 9/2017 | Colony | A63F 13/32 |
| 9,821,211 | B2 * | 11/2017 | Colony | G06Q 50/34 |
| 11,497,964 | B1 * | 11/2022 | Hunter | A63B 53/005 |
| 2002/0119823 | A1 * | 8/2002 | Beuscher | A63F 13/812<br>463/42 |
| 2008/0005775 | A1 * | 1/2008 | Belton | A63F 13/338<br>725/139 |
| 2008/0032797 | A1 * | 2/2008 | Harris | H04N 21/4781<br>463/40 |
| 2014/0100006 | A1 * | 4/2014 | Jennings | A63F 13/65<br>473/499 |
| 2016/0346673 | A1 | 12/2016 | Maggio | |
| 2017/0225069 | A1 | 8/2017 | Shachar et al. | |
| 2018/0093133 | A1 * | 4/2018 | Decarlo | A63B 24/0075 |
| 2019/0160356 | A1 * | 5/2019 | Lalaoua | A63B 63/004 |
| 2020/0032534 | A1 * | 1/2020 | Crookham | A63B 63/004 |
| 2020/0081521 | A1 | 3/2020 | Mullen | |
| 2020/0114240 | A1 | 4/2020 | Goslin et al. | |
| 2021/0146220 | A1 * | 5/2021 | Hall | A63B 63/004 |
| 2021/0316197 | A1 * | 10/2021 | Ilhan | A63B 71/0669 |

* cited by examiner

SYSTEM FOR INTEGRATING PHYSICAL AND ELECTRONIC SPORTS

RELATED APPLICATIONS

This application is the U.S. National Phase of and claims priority to International Patent Application No. PCT/TH2022/000010, International Filing Date Mar. 21, 2022, entitled System For Integrating Physical And Electronic Sports, which is incorporated herein by reference in its entirety.

TECHNICAL FIELD

This disclosure relates generally to devices, systems, processes, technology, and methods of playing sports, and more specifically to devices, systems, processes, technology, and methods combining the mechanism of play for electronic and physical sports, such as football (e.g. Football/Soccer, American Football, Canadian Football, Rugby Union, Rugby League, Australian Rules, or similar sports), basketball, netball, hockey, lacrosse, or other goal (e.g. goal, hoop, uprights, or the like) based sports and to provide entertainment using such devices, systems, processes, technology, and methods.

BACKGROUND OF THE INVENTION

Both electronic sports, also called e-sports, and physical sports are popular forms of recreation, entertainment, and competition. As electronic sports have developed, there has been a trend that merges the electronic and physical sporting experience, for example Pat. App. No. 2020/0,368,616 describes an interactive mixed reality system, in which both real-world entities and virtual world entities are integrated to allow aspects of the physical world to be a part of the electronic gaming or sporting environment. Other methods of combining electronic and physical sports also use the physical as an input for electronic games. For example, the U.S. Pat. No. 8,313,379 describes a home entertainment system for video game system including a modular remote wireless handheld game control device with capabilities including position sensing. The Nintendo® Wii® home entertainment system allows the user to control movements in various electronic games and sports using realistic body movements.

U.S. Pat. No. 5,860,862 describes an interactive apparatus and method which allows the participants to compete in an interactive game based on an event which is occurring in real time. Further, the systems and methods seek to allow remote or electronic players to interact with physical sporting events in real time. However, electronic sports players remain unable to play electronic sports at the same time and on the same team as physical sports players. In addition, the methods and systems for electronic sports players to affect the physical environment have not been integrated into physical sports game play to allow for more satisfying recreation, entertainment and competition.

The present disclosure seeks to overcome these limitations by providing systems and methods that allow electronic sports players to control the physical sporting environment for the advantage of their team or the disadvantage of the opposing team during the course of a physical sporting game.

SUMMARY OF THE INVENTION

Accordingly, it is an object of the present invention to provide a system in which electronic sports players play electronic sports at the same time and on the same team as physical sports players.

Therefore, it is a primary objective of the present invention to provide a hybrid electronic and physical sports experience by combining the mechanism and field of play for physical and electronic sports, creating a hybrid sporting environment.

It is another objective of the present invention to provide a gaming system in which an electronic sports player controls a physical playing environment for the advantage of their team or the disadvantage of the opposing team during the course of a physical sport.

One embodiment disclosed herein provides a system for a hybrid electronic and physical sporting experience including the physical playing environment for the pair of teams to play the physical sport, a sporting object for playing the physical sport within the physical playing environment, a plurality of components of the physical playing environment, at least two electronic game controllers, and a display board, wherein at least one component of the physical playing environment is modified to receive electronic communication from at least two electronic game controllers each of the two electronic game controllers associated with one of the teams, and to change state in response to a predetermined electronic communication from one of the electronic game controllers, wherein the display board is capable of receiving electronic communication from the electronic game controllers and displays a status of the hybrid electronic and physical sporting experience.

Another embodiment disclosed herein provides a hybrid electronic and physical sporting experience comprising a physical playing field including at least two goals, a plurality of electronic game controllers in electronic communication with the goals, a lighting system for the physical playing field in electronic communication with the electronic game controllers and a display board for displaying the status of a game played in the physical playing field and in electronic communication with the electronic game controllers wherein each goal is associated with one team and at least one electronic game controller is associated with each team.

Another embodiment disclosed herein provides a hybrid electronic and physical team sporting environment comprising means for playing the physical team sport including the physical sporting environment, a plurality of means for playing the electronic sport, each in electronic communication with at least one part of the physical sporting environment, and a means for modifying the physical sporting environment in response to electronically communicated instructions from the means for playing the electronic sport.

One embodiment disclosed herein provides a system for a hybrid electronic and physical sporting experience wherein at least one component of the playing environment includes at least one goal.

Another embodiment disclosed herein provides a system for a hybrid electronic and physical sporting experience wherein at least one component of the playing environment includes a lighting system, a sound system, an interactive floor projection system, a hologram projection system, or a smoke and fan system.

Yet another embodiment disclosed herein provides a system for a hybrid electronic and physical sporting experience wherein the electronic game controllers allow users to send instructions to modify the lighting system, the sound system, the interactive floor projection system, the smoke and fan system, the hologram projection system, the display board, and at least one of the goals.

Another embodiment disclosed herein provides a system for a hybrid electronic and physical sporting experience wherein at least one component of the playing environment includes at least two goals, each associated with one of the teams. The predetermined electronic communication from the electronic game controller associated with a first team may instruct the goal associated with a second team to increase in size.

The predetermined electronic communication from the electronic game controller associated with the first team may instruct the goal associated with the first team to decrease in size.

The plurality of electronic game controllers may include a first electronic game controller associated with the first team and the second game controller associated with the second team.

The plurality of electronic game controllers may also include a third electronic game controller associated with a neutral game manager.

The means for modifying the physical sporting environment may also include a means for size adjustment of a first goal, a means for size adjustment of a second goal, a means for adjusting the lighting system, and a means for adjusting the sound system.

The means for modifying the physical sporting environment may also include a means for height adjustment of the first goal and a means for height adjustment of the second goal.

The means for modifying the physical sporting environment may also include a means for adjusting direction and intensity of lighting from the lighting system.

The predetermined electronic communication from the electronic game controller associated with the first team may include instructions for the lighting system to project additional light into an eyeline of the second team for a predetermined period.

The predetermined electronic communication from the electronic game controller associated with the first team may include instructions for the lighting system to reduce light for a predetermined period.

The means for playing the physical sport may also include a means for displaying game status and rule changes.

The means for playing the electronic sport may be one of a cell phone, a tablet, a touchscreen device, a virtual reality headset, an audio input headset, an audio input device, or a wearable device for audio or touch input.

In addition to the foregoing illustrative summary, the disclosed invention may include any feature or step, or group of features or steps, which is/are shown in the description and/or the drawings. Other exemplary advantages and/or objectives of the invention disclosed herein, and the manner in which the same are accomplished, are further explained in the following detailed description and the accompanying drawings.

Effects(S) of the Invention

An object of the invention is to provide an entertainment and sporting system by combining the mechanism of playing physical and electronic sports in which electronic sports players control the physical sporting environment for the advantage of their team or the disadvantage of the opposing team during the course of the physical sporting game.

BRIEF DESCRIPTION OF THE DRAWINGS

Now referring to the attached drawings which form a part of this original disclosure.

DETAILED DESCRIPTION OF THE INVENTION

Figure 1:
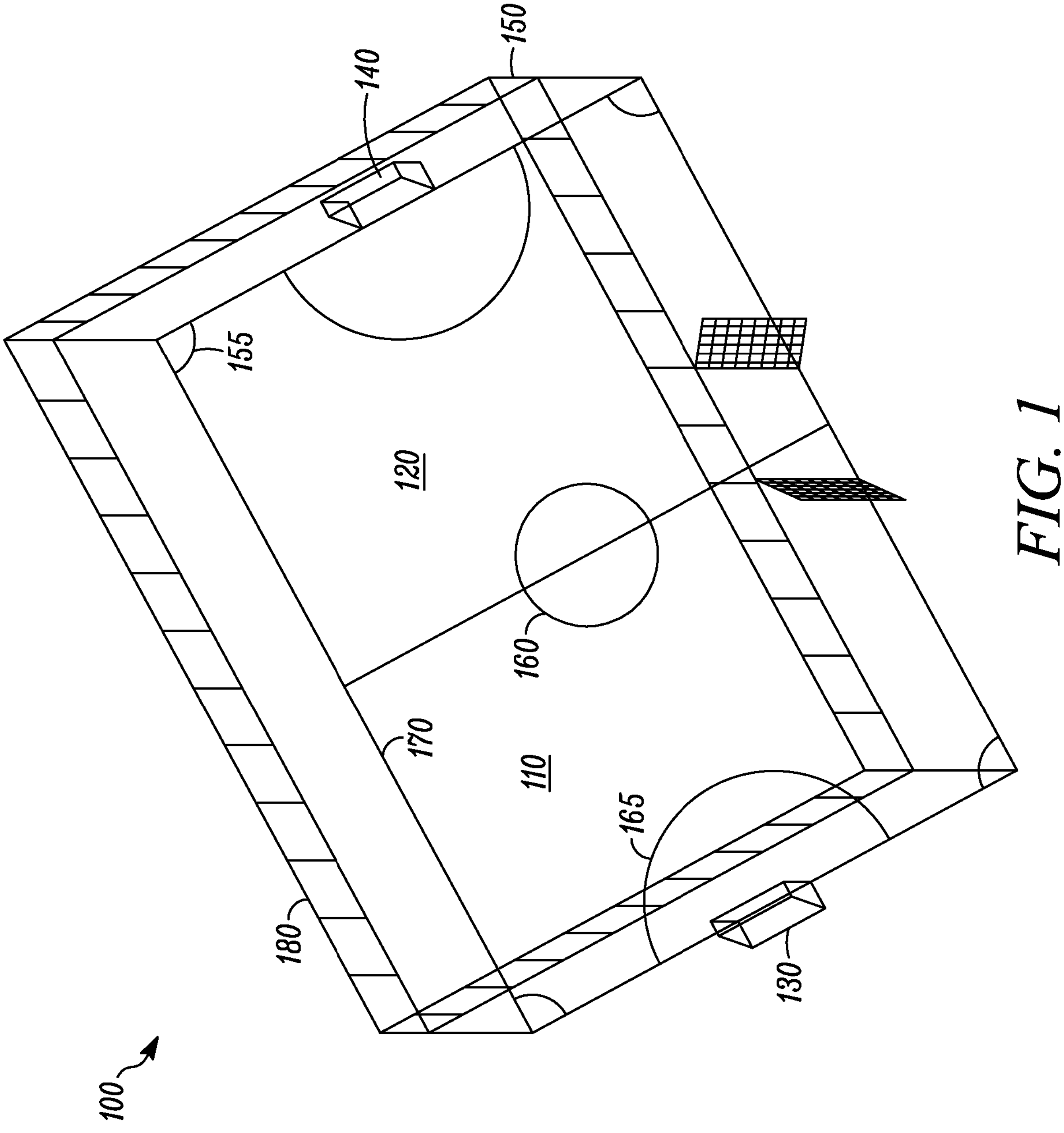
FIG. 1 shows a physical playing environment for a pair of teams to play, according to one embodiment of the present invention.

Disclosed herein is a system and method that integrate electronic and physical sport by allowing electronic sport players to control the physical sporting environment.

As used herein, the term "electronic communication" indicates any form of communication that is transmitted, stored, or viewed using electronic media, for example wireless and wired transmissions (such as Wi-Fi, Bluetooth or the like and transmission via cables, including LAN cables, MIDI cables, audio cables, HDMI cables, or the like), electronic storage media, (such as computer readable storage media, for instance, a fixed (hard) drive, diskette, optical disk, magnetic tape, semiconductor memory such as read-only memory (ROM) or flash memory, etc., or any transmitting/receiving medium such as the Internet or other communication network or link, or any other electronic storage media), and electronic displays (such as a CRT (cathode ray tube), LCD (liquid crystal display), or LED (light emitting diode), or other type of electronic monitor) for displaying information. Various implementations of the systems and methods described here can be realized using digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The system for the hybrid electronic and physical sporting experience includes the physical playing environment wherein at least one of the components of the physical playing environment may be controlled and modified by at least one of the plurality of electronic game controllers. One electronic game controller is associated with each of the teams, and a third electronic game controller may be associated with a neutral game director or referee.

The components of the physical playing environment include the pair of goals, each associated with one of the teams. The components of the physical playing environment may also include a lighting system, a sound system, an interactive floor projection system, a hologram projection system, and a smoke and fan system. Other components of the physical playing environment may be controlled and modified by electronic game controllers, as known by those skilled in the art or each particular sport. The lighting system, the sound system, the interactive floor projection system, the hologram projection system, and the smoke and fan system are in electronic communication with at least one of the plurality of electronic game controllers. In some embodiments, for example, only the electronic game controller associated with a neutral game director or referee is in electronic communication with the smoke and fan system. In other embodiments, the lightning system, the sound system, the interactive floor projection system, the hologram projection system, and the smoke and fan system are in electronic communication with all of the electronic game controllers.

A system for a hybrid electronic and physical sporting experience includes the physical playing environment (100) for the pair of teams (not shown) to play a physical sport as shown in FIG. 1. In some embodiments, the pair of teams are both human teams. In other embodiments, the pair of teams may comprise a human team and a team comprising some or all computerized and/or robot players. The physical playing environment (100) includes a plurality of components of the playing environment, for example a pitch having a first half (110) associated with a first team and a second half (120) associated with a second team, a sideline (170), penalty area (165), a centre circle (160), a corner arc (155), a goal line (150), and a fence or barrier (180). A sporting object, for example a ball, shuttlecock, puck or the like, for playing the physical sport within the physical playing environment (100) is also a part of the system. In a preferred embodiment, the size of pitch must be between 12-15 meters wide and 20-25 meters long with the penalty area (165) semi-circle radius being 2 meters and 4 meters wide.

Further, the components of the playing environment (100) include the pair of goals (130, 140) wherein, each goal is associated with one of the teams associated with each respective half (110, 120). The first goal (130) is associated with the first team and first half (110) and the second goal (140) is associated with the second team and second half (120). Further, the height of at least one of the goals (130, 140) may be adjusted by receiving instructions from an electronic game controller. The height adjustment may be for the duration of game play or for a predetermined time. For example, the height of the first goal (130) may be increased by an e-sport player on the second team using an associated electronic game controller. Alternatively, the height of the height of the first goal (130) may be decreased by an e-sport player on the first team using an associated electronic game controller. In some embodiments, the width of at least one of the goals (130, 140) may be adjusted by receiving instructions from an electronic game controller. A neutral game director or referee using another electronic game controller unassociated with any of the teams my increase or decrease the height of either goal as a penalty or for other entertainment or sporting purposes.

The hybrid system also includes a display board, not shown, for displaying game status and rule changes. The display board is capable of receiving electronic communication from the electronic game controllers and displaying a status of the hybrid electronic and physical sporting experience. For example, the display board may be configured to display changes in the time left in game or game clock, provide notices about changes in game rules, game players, or items played by e-sports players, or the like in response to receiving electronic communication from the electronic game controllers. The display board may also be configured to display and update the score and the time left in game or game clock.

Figure 2:
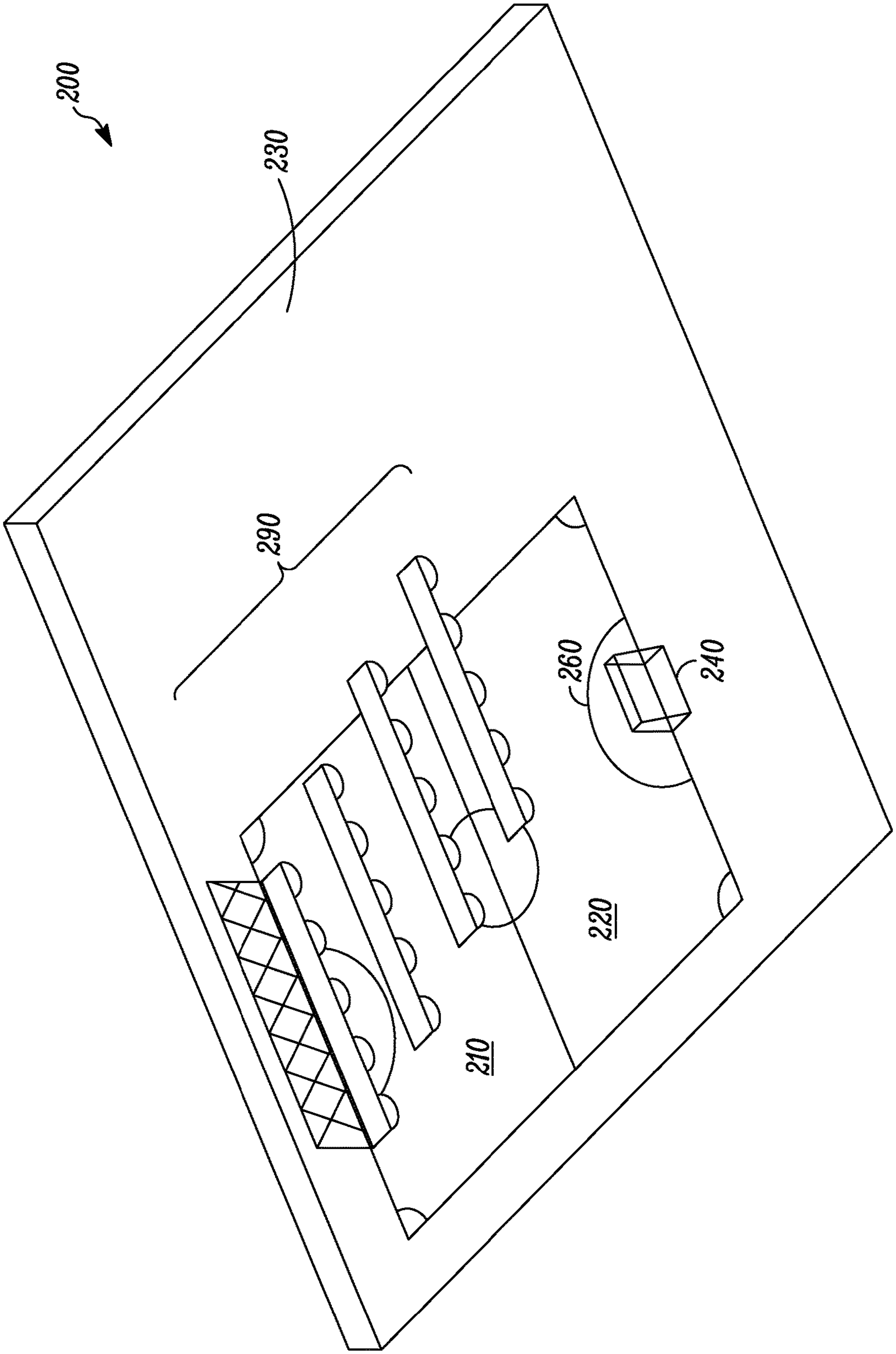
FIG. 2 shows a lighting system as a component of physical playing environment according to another embodiment.

FIG. 2 shows the playing environment (200) which includes a field with a first half (210) associated with a first team, a second half (220) associated with a second team, goals (240) and penalty areas (260), and a ceiling (230) mounted lighting system (290). The components of the playing environment (200) include the lighting system (290) wherein the lighting system (290) includes a plurality of lights mounted on the ceiling (230) as shown in FIG. 2. Alternate embodiments may include lighting systems with freestanding lights around the playing field. The lighting system (290) also includes an array of electronic circuits for electronic control of lighting direction and intensity and to receive instructions from the electronic game controllers. The lighting system (290) of the physical playing environment (200) is capable of receiving the predetermined electronic communication from at least one of the electronic game controllers. The lighting system (290) of the physical playing environment (200) is capable of adjusting the direction and/or intensity of the lighting on the pitch and/or a portion of the pitch from the lighting system (290) in response to predetermined electronic communication for the electronic game controllers.

Electronic game controllers may be loaded with a plurality of predetermined electronic communications for strategic use during game play. In some embodiments, predetermined electronic communication from an electronic game controller associated with the first team instructs the lighting system (290) to project additional light into an eyeline of the second team for a predetermined period. In some embodiments, the predetermined electronic communication from the electronic game controller associated with the first team instructs the lighting system (290) to reduce light on some or all of the playing field for a predetermined period. In some embodiments, the predetermined electronic communication from an electronic game controller may instruct the sound system to change the tempo or volume of the game audio or to play distracting sounds such as sirens or the like. For example, predetermined electronic communication from an electronic game controller associated with the first team may instruct the sound system to play loud music for a predetermined period to obstruct verbal communication on the second team.

The electronic game controllers allow users, including electronic sports team members, neutral game directors, and referees, to send instructions to the lighting system (290) thereby modifying the physical sporting environment (200) by adjusting the direction and/or intensity of lighting from the lighting system (290) to the physical sports field.

The system for hybrid electronic and physical sporting experience includes a display board wherein the display board is in electronic communication with the electronic game controllers. The electronic game controllers allow users, including electronic sports team members, neutral game directors, and referees, to modify the display board. The display board receives electronic communication from the electronic game controllers and displays the status of the hybrid electronic and physical sporting experience. For example, the display board may display the score, time left in game, time left for any modifications played by e-sports players, status of any modifications played by e-sports players, or the like.

Figure 3:
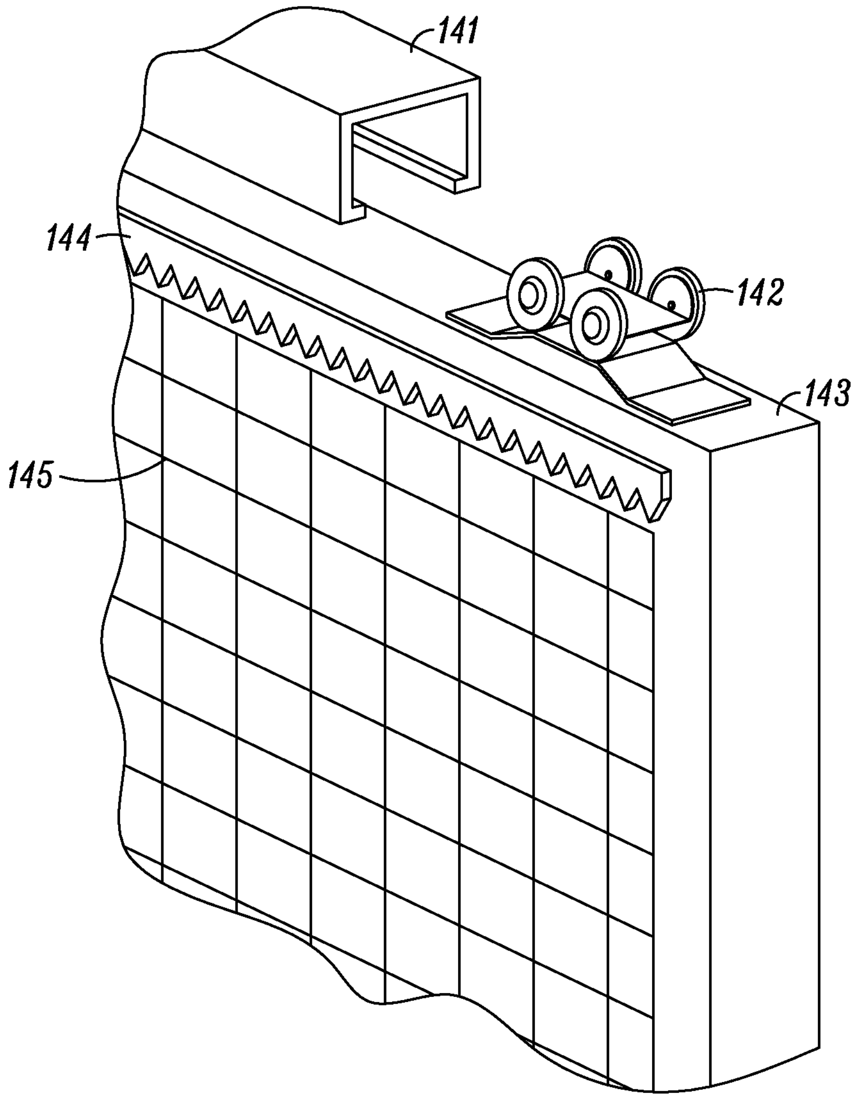
FIG. 3 is a close-up view of a portion of the goal assembly according to some embodiments.

The dimensions of the goal are controlled mechanically in response to predetermined electronic communications from the electronic game controllers and expand and contract according to e-sport items in use by users of the electronic game controllers. For example, the goal may be adjusted hydraulically or by one or more motors and linear actuators. FIG. 3 shows a close-up view of a portion the goal assembly according to some embodiments. The assembly comprises a track (141), roller wheels (142), a frame (143), a first mechanical rack (144) and a barrier mesh (145). A motor may drive a pinion to engage the first mechanical rack (144) to slide the frame (143) holding the barrier mesh (145) on the roller wheels (142) in the track (141) so that frame (143) and barrier mesh (145) cover a side portion of the goal (140). The track (141) may be integrated into the top bar of the goal (140). Alternatively other methods to adjust the size of the goals may be used.

Figure 4:
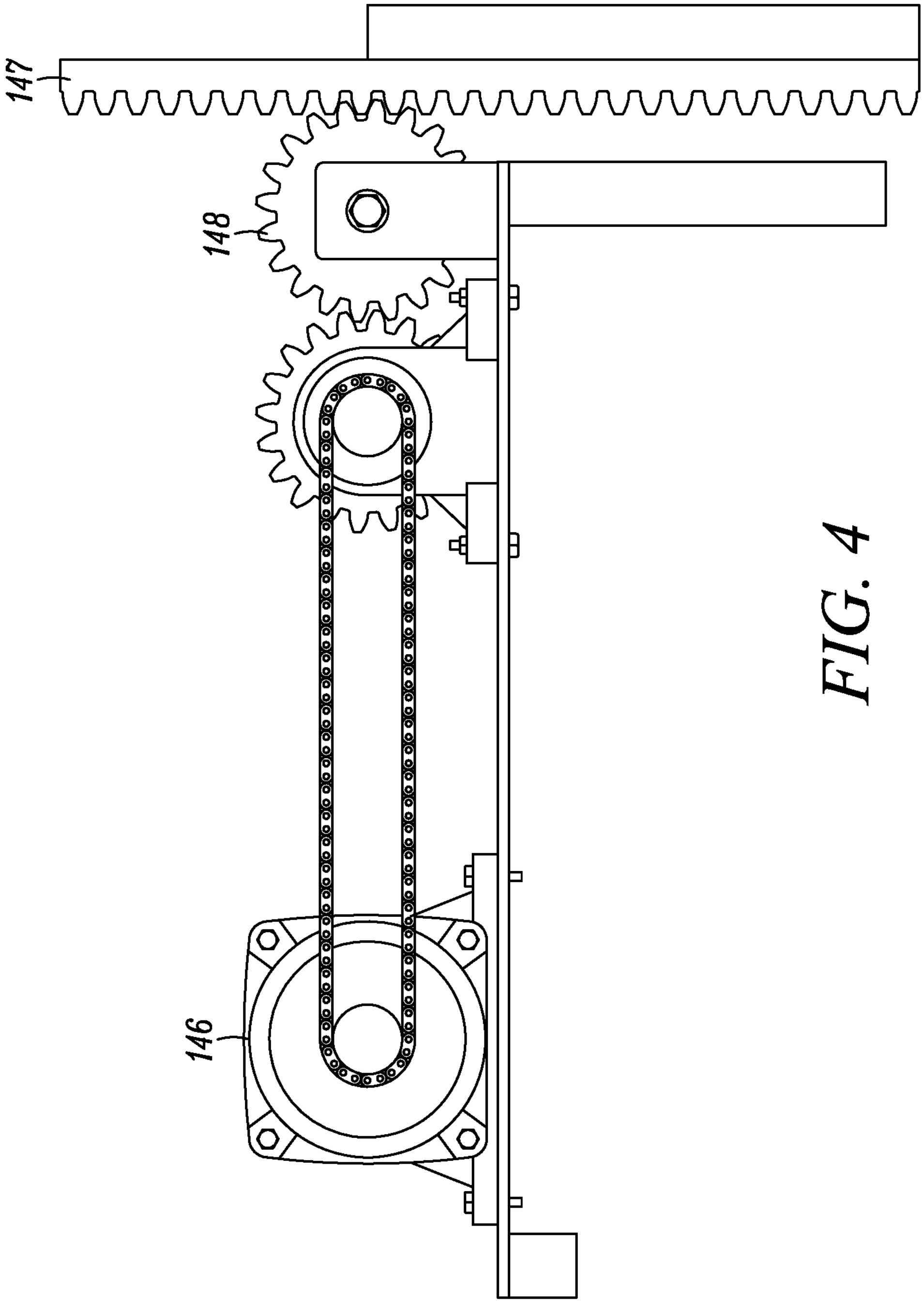
FIG. 4 is a close-up view of a motor assembly for adjusting height of the goal according to some embodiments.

FIG. 4 shows a close-up view of a motor assembly for adjusting height of the goal according to some embodiments. The assembly comprises a second mechanical rack (147) attached to a second frame, a pinion gear (148) and a motor (146). The motor drives the second mechanical rack (147) and pinion gear (148) mechanism by rotating the pinion gear (148) thereby lifting or lowering a panel of barrier mesh, surrounded by a frame extending below the pinion gear (148), to cover or uncover at least a top portion of the goal (140). In some embodiments, the panel may be lowered to cover the entire entrance of the goal (140). The second mechanical rack (147) and pinion gear (148) mechanism adjusts the height of the goal assembly either by vertical lifting or lowering the panel of barrier mesh surrounded by the frame extending below the pinion gear (148). The motor (146) may be an electric motor in some embodiments. The motor (146) is started when the assembly receives instructions from one of the plurality electronic game controllers. For example, the height of the second goal (140) (as shown in FIG. 1) may be increased when an e-sport player on the first team uses an associated electronic game controller to send corresponding instructions to the motor (146). In addition, the height of the second goal (140) (as shown in FIG. 1) may be decreased when an e-sport player on the second team uses an associated electronic game controller to send corresponding instructions to the motor (146).

In one exemplary embodiment, the invention discloses a hybrid electronic and physical sporting experience that includes a physical playing environment for the pair of teams to play futsal including two goals wherein the first goal is associated with the first team and the second goal is associated with the second team. Further, the height of goal is adjusted by receiving instructions from one of the plurality of electronic game controllers. A first controller is associated with the first team and a second controller is associated with the second team. Also, the lighting system, the sound system, the interactive floor projection system, the hologram projection system, and/or the smoke and fan system of the physical playing environment can be modified in response to instructions from one of the plurality of electronic game controllers.

In another exemplary embodiment, the invention discloses a hybrid electronic and physical sporting experience that includes a physical playing environment for a pair of teams to play ice hockey wherein, the system includes two goals wherein, the first goal is associated with first team and the second goal is associated with the second team. Further, the height and width of the goals are adjusted by receiving instructions from one of the plurality of electronic game controllers. A first controller is associated with the first team and a second controller is associated with the second team. Also, the lighting system, the sound system, the interactive floor projection system, the hologram projection system, and/or the smoke and fan system of the physical playing environment can be modified in response to instructions from one of the plurality of electronic game controllers.

In another exemplary embodiment, the invention discloses an apparatus and method of playing football (e.g. Futsal, Soccer/Football, American Football, Canadian Football, Rugby Union, Rugby League, Australian Rules, or similar sports) wherein, the system includes two goals wherein, the first goal is associated with first team and the second goal is associated with the second team. Further, the height of goal is adjusted by receiving instructions from one of the plurality of electronic game controllers. A first controller is associated with the first team and a second controller is associated with the second team. Also, the lighting system, the sound system, the interactive floor projection system, the hologram projection system, and/or the smoke and fan system of the physical playing environment can be modified in response to instructions from one of the plurality of electronic game controllers.

Figure 5:
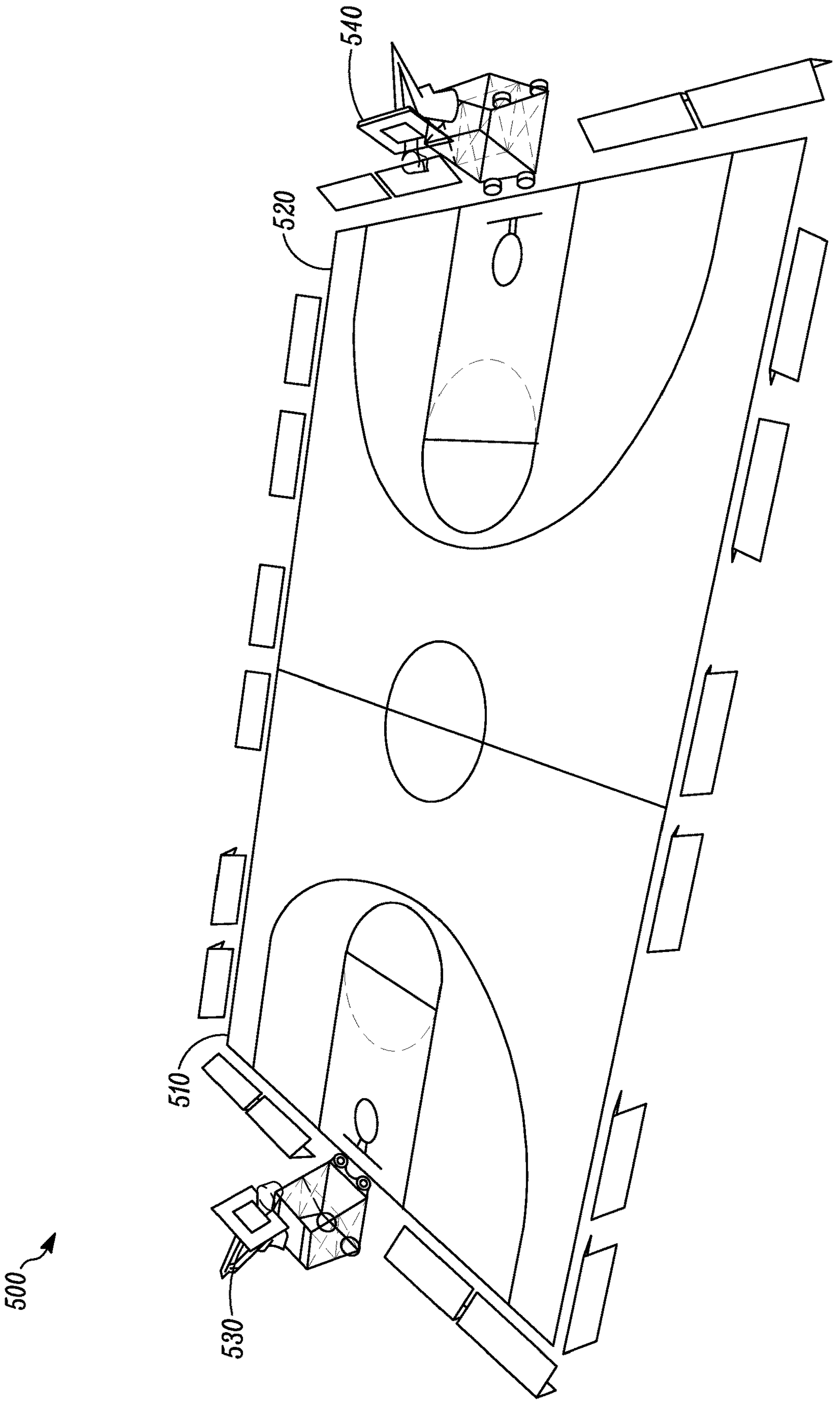
FIG. 5 shows another exemplary embodiment of the physical playing environment for playing hybrid physical and electronic basketball.

FIG. 5 shows another exemplary embodiment of the physical playing environment for playing hybrid physical and electronic basketball. The illustrated system for a hybrid electronic and physical sporting experience includes a physical playing environment (500) suitable for playing the physical sport of basketball, two basketball hoop assemblies (530, 540), each having a goal, or basketball hoop, wherein, the first goal is associated with a first half of the basketball court (510) associated with a first team and the second goal is associated with a second half of the basketball court (520) associated with the second team. The basketball hoop assemblies (530, 540) may include backboards, goals (i.e. hoops), robot arms, supporting structure, and wheels. The basketball hoop assemblies (530, 540) include robot arms for holding up the backboards and goals and adjusting the height thereof in response to electronic communication from electronic game controllers. The basketball hoop assemblies (530, 540) may also be mounted on wheels and motorized to allow the entire assembly to be moved in response to electronic communication from electronic game controllers. For example, the basketball hoop assembly (540) may be moved farther away form the second half of the basketball court (520) in response to electronic communication from an electronic game controller associated with the second team to make it more difficult for physical sport players on the first team to score points.

A plurality of electronic game controllers are in electronic communication with the goals and at least one electronic game controller is associated with each team. Further, at least one goal of the physical playing environment (500) is modified to receive a predetermined electronic communication from at least one of the electronic game controllers. In some embodiments, the predetermined electronic communication includes instructions for changing the diameter or width of the basketball hoop or goal. In some embodiments, the predetermined electronic communication includes instructions for changing the height of the goal, i.e. basketball hoop, by modifying the height of the support. For example, the goal may be adjusted by a robot arm, hydraulically or by one or more motors. In some embodiments, the predetermined electronic communication from the electronic game controller associated with the first team instructs the robot arm that is a part of basketball hoop assembly (540) associated with the second team to decrease the height of the goal. In addition to this, another predetermined electronic communication from the electronic game controller associated with the first team may instruct the robot arm that is part of basketball hoop assembly (530) associated with the first team to increase the height of the goal.

Figure 6A:
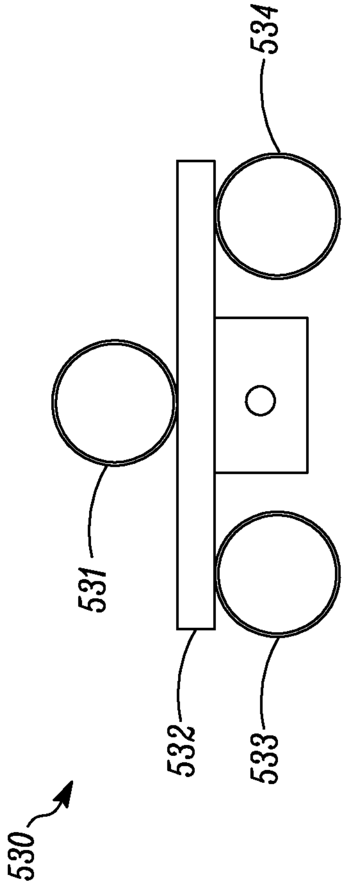
FIGS. 6(*a*) and 6(*b*) are top view details of a goal according to an embodiment shown in FIG. 5.
Figure 6B:
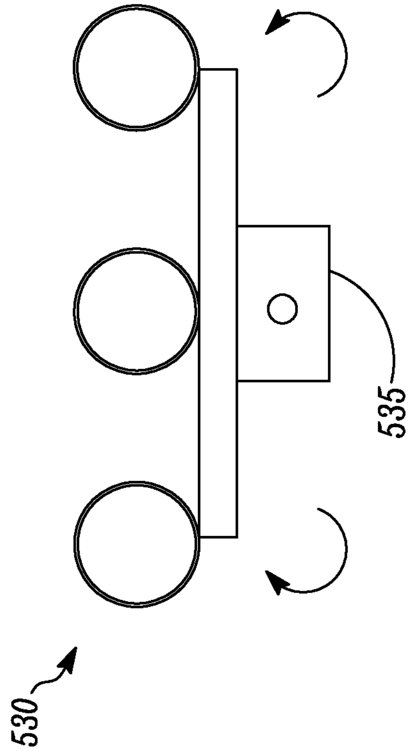

FIGS. 6(*a*) and 6(*b*) are top view details of a portion of the basketball hoop assembly (530) associated with the first team. In some embodiments, a basketball hoop assembly (530) includes a backboard (532), a goal (531), a first reserve goal (533), a second reserve goal (534), and a mechanism (535) for moving the reserve goals (533, 534) from behind the backboard to the front of the backboard facing the field of play with the goal (531). The mechanism (535) may be any electronically controlled mechanism, such as a motor and actuators and may be partially or wholly integrated into the backboard (532). In some embodiments, the backboard (532) comprises an LED (light emitting diode) display and performs some or all of the functions of the display board.

In some embodiments, the electronic game controllers may be configured to deliver instructions to move additional goals into the field of play. For example, the physical playing environment for playing hybrid physical and electronic basketball may be provided with basketball hoop assemblies having multiple hoops or goals, as shown in FIG. 6. One or more of the reserve goals (533, 534) may be moved by the mechanism (535) into the field of play for a predetermined period in response to a predetermined electronic communication from an electronic game controller associated with the second team. During that period, physical sport players on the second team may collect points by using any of the goals in the field of play, thereby providing additional goals for the physical sports players. In other embodiments, additional basketball hoop assemblies may be moved onto the field of play, thereby providing additional goals for the physical sports players.

The present invention provides devices, systems, processes, technology, and methods for the electronic sports player to affect the physical sporting environment for physical sports players as a member of a hybrid physical and electronic sports team. The electronic sports players modify the physical sporting environment for the advantage of their team or the disadvantage of the opposing team during the course of a physical game. For example, in some embodiments the physical sporting environment may include a smoke and fan system, a hologram projection system, and/or an interactive projection system.

For example, in some embodiments, the interactive projection system may project objects onto the playing field, a portion of the playing field, or at least one goal, for a predetermined period in response to a predetermined electronic communication from an electronic game controller associated with the first team. During that period, physical sport players on the first team may collect additional points by passing the ball over or stepping on the projected objects. In some embodiments, only the physical sports player in control of the sporting object (ball, shuttlecock, puck or the like) would collect points by running or dribbling over the projected objects. The interactive projection system may be configured to monitor interaction with the projected objects with infrared or digital light processing (DLP®) technology, delete projected objects after they have been interacted with, and provide updated scores to the display board.

For example, in some embodiments, the hologram projection system may project three dimensional objects, or holograms, onto the playing field, a portion of the playing field, or at least one goal, for a predetermined period in response to a predetermined electronic communication from an electronic game controller associated with the first team. During that period, physical sport players on the first team may be able collect additional points by interacting with the projected holograms. For example, the electronic game controller may send instructions to the hologram projection system to project a hologram indicating a smaller target within a goal. In some embodiments, only the physical sports player in control of the sporting object (ball, shuttlecock, puck or the like) would collect additional points by hitting or passing through the hologram indicating a smaller target within the goal. The hologram projection system may be configured to monitor interaction with the projected holograms, delete projected holograms after they have been interacted with, and provide updated scores to the display board.

In some embodiments, the smoke and fan system may include, for example, theatrical smoke and/or fog machines and fans configured to remove the smoke quickly from the playing field. As used herein, "smoke" may refer to smoke, fog, haze or other substance created to obscure the field of vision on the playing field. In some embodiments, the smoke and fan system may introduce smoke onto the playing field, or near a goal, in response to a predetermined electronic communication from an electronic game controller associated with the first team. In response to a second predetermined electronic communication from a second electronic game controller associated with the second team, the smoke and fan system may blow away the smoke that was introduced in response to a e-sports play by the first team's e-sport player. The electronic sport is played by means of an electronic device such as a cell phone, a tablet, a touchscreen device, virtual reality headset, audio input headset, audio input device, wearable device for audio and/or touch input, or the like. Further, one means of playing the electronic sport is associated with the first team and another means for playing the electronic sport is associated with the second team.

In one embodiment the system of for playing the electronic sport comprises three electronic game controllers wherein, a first game controller is associated with the first team, a second game controller associated with the second team and a third game controller is associated with a neutral game manager. In one embodiment the neutral game manager is called director. In another embodiment, the neutral game manager may be called a referee.

Figure 7A:
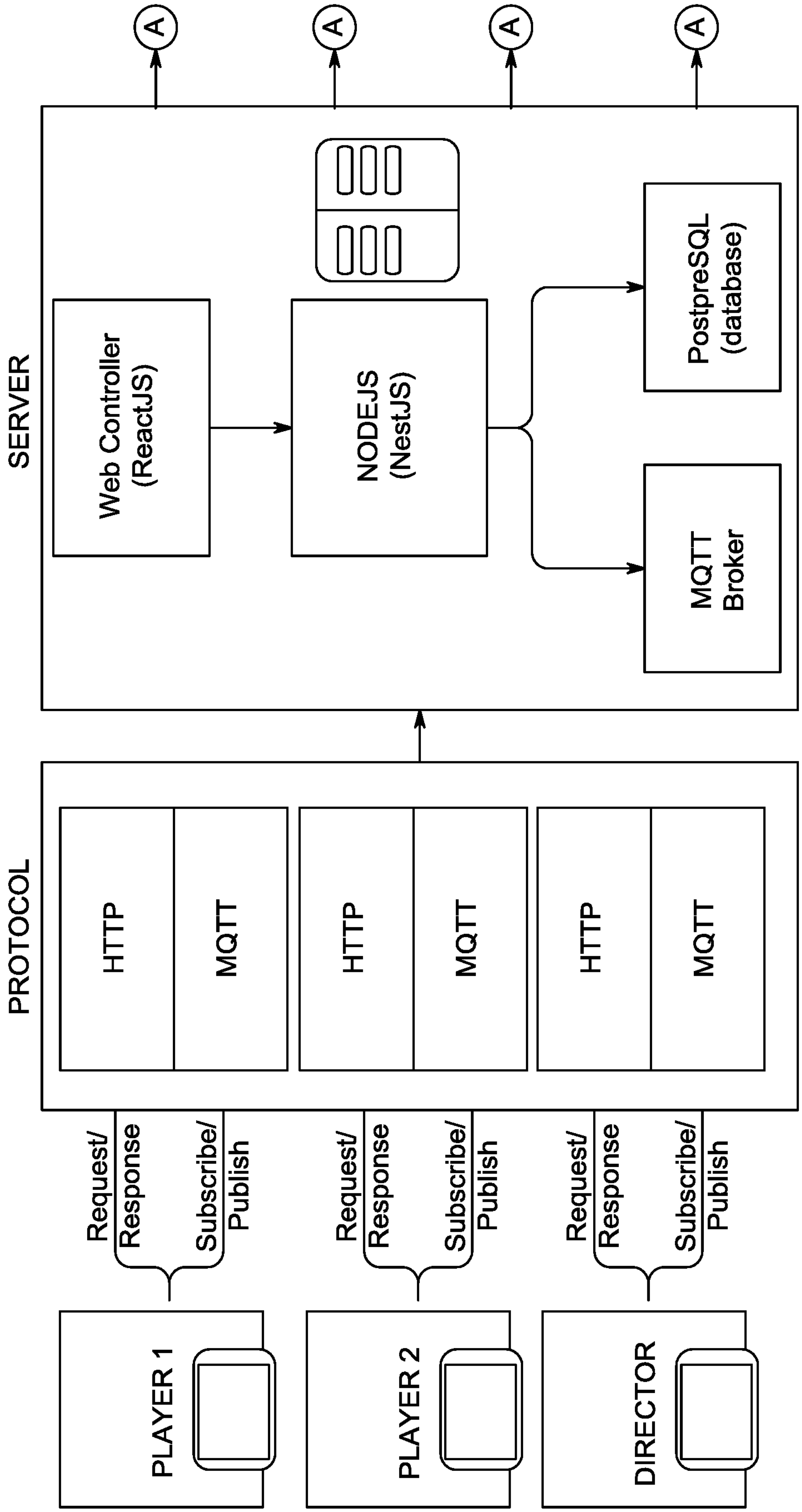
FIGS. 7(*a*) and 7(*b*) show an embodiment of the system architecture used for electronic communication between the electronic game controllers and components of the playing environment.
Figure 7B:
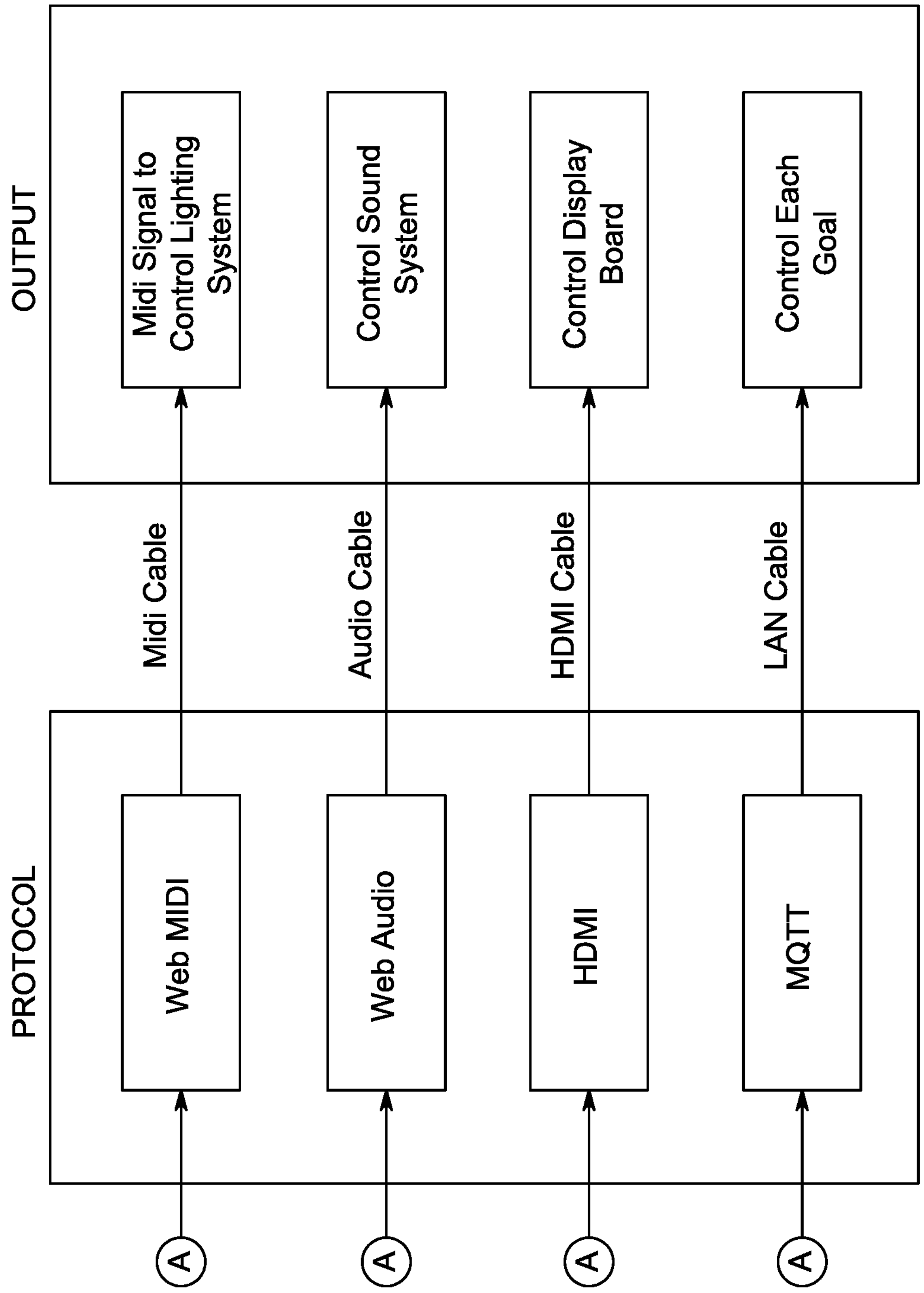

FIGS. 7(*a*) and 7(*b*) show an embodiment of the system architecture used for the hybrid electronic and physical sporting experience. The electronic game controllers are gaming clients, used by e-sport players and a neutral game director, for example. The electronic game controllers may interact with a server via protocols such as HTTP and MQTT. In some embodiments, the server comprises a web controller using, for example, using React.JS, a server side application, for example, using Node.JS, a database, such as one using PostgreSQL, and an MQTT broker. The architecture shown allows the e-sport players and a neutral game director to deliver instructions to modify the lighting system, the sound system to provide game audio, the display board or score board, and at least one of the goals. In other embodiments, other outputs may allow one or more of the users to deliver instructions to a smoke and fan system, a hologram projection system, or an interactive projection system. The server sends the instructions via protocols such as Web MIDI, web audio, HDMI, MQTT, or the like, by using interfaces such as MIDI cable, audio cable, HDMI cable, LAN cable, Wi-Fi, or the like. The instructions may include instructions to increase the size of goal, decrease the size of goal, adjust the size of goal, project additional light into an eyeline of a second team for a predetermined period, reduce light for a predetermined period, adjust direction and intensity of light, play distracting sounds, such as sirens, change the tempo or volume of music or other game audio, change the time left in game or game clock, update the score, provide notices about changes in game rules, game players, or items played by e-sports players, or the like.

The devices, systems, processes, technology, and methods disclosed herein are not limited to futsal, football and basketball. They are also applicable to netball, hockey, ice hockey lacrosse, or other goal (e.g. goal, hoop, uprights, or the like) based sports and provide recreation, competition, and entertainment using such devices, systems, processes, technology, and methods disclosed herein. In another exemplary embodiment, the invention discloses an apparatus and method of playing any physical sport having at least one goal wherein, each goal is associated with a team. For example, a hybrid physical and electronic streetball or half-court basketball experience may have a physical playing environment including one goal. The goal is associated with the first team on offense. The association of the goal changes to the other team when the offending team scores or when the defending team gains possession of the ball and clears the ball past the three-point line to make the goal associated with the second team. In other embodiments, the electronic game controllers may be configured to deliver instructions to move additional goals into the field of play, for example as discussed above in reference to FIG. 6.

It is understood that the preceding description is given merely by way of illustration and not in limitation of the invention and that various modifications may be made thereto without departing from the spirit of the invention as claimed.

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "having" and "including" and their derivatives. Also, the terms "section, "part," "portion," "member" or "element" when used in the singular can have the dual meaning of a single part or a plurality of parts.

Moreover, in this document, relational terms such as first and second, top and bottom, and the like may be used solely to distinguish one entity or action from another entity or action without necessarily requiring or implying any actual relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A system for a hybrid electronic and physical sporting experience, including:

a physical playing environment for a pair of teams to play a physical sport wherein at least one component of the physical playing environment is modified to receive electronic communication from at least two electronic game controllers, each of the two electronic game controllers associated with one of the teams, and in response to predetermined electronic communication from one of the electronic game controllers, to change state;

a sporting object for playing the physical sport within the physical playing environment; and a display board capable of receiving electronic communication from the electronic game controllers and displaying a status of the hybrid electronic and physical sporting experience, wherein the at least one component of the playing environment includes at least two goals, each associated with one of the teams, and wherein the predetermined electronic communication from the electronic game controller associated with a first team instructs the goal associated with a second team to increase in size or wherein the predetermined electronic communication from the electronic game controller associated with the first team instructs the goal associated with the first team to decrease in size.

2. The system of claim 1, wherein the at least one component of the playing environment includes at least one goal.

3. The system of claim 2, wherein the at least one component of the playing environment includes a lighting system, a sound system, an interactive floor projection system, a hologram projection system, or a smoke and fan system.

4. The system of claim 3, wherein the predetermined electronic communication from the electronic game controller associated with a first team instructs the lighting system to project additional light into an eyeline of a second team for a predetermined period.

5. The system of claim 3, wherein the predetermined electronic communication from the electronic game controller associated with a first team instructs the lighting system to light for a predetermined period.

6. A hybrid electronic and physical team sporting environment, comprising:

a physical playing field including at least two goals, wherein each goal is associated with a team;

a plurality of electronic game controllers in electronic communication with the goals and wherein at least one electronic game controller is associated with each team;

a lighting system for the physical playing field in electronic communication with the electronic game controllers wherein a predetermined electronic communication from the electronic game controller associated with a first team instructs the lighting system to reduce light for a predetermined period; and a display board for displaying a status of a game played in the physical playing field and in electronic communication with the electronic game controllers.

7. The environment of claim 6, wherein the electronic game controllers allow users to send instructions modifying the lighting system, the display board, and at least one of the goals.

8. The environment of claim 6, wherein the plurality of electronic game controllers includes a third electronic game controller associated with a neutral game manager.

9. A hybrid electronic and physical team sporting environment, comprising:

means for playing a physical team sport including a physical sporting environment, wherein the physical sporting environment includes a first goal associated with a first team and a second goal associated with a second team;

a plurality of means for playing an electronic sport, each in electronic communication with at least one part of the physical sporting environment; and means for modifying the physical sporting environment in response to electronically communicated instructions from the means for playing the electronic sport, wherein the means for modifying the physical sporting environment include a means for size adjustment of the first goal, and a means for size adjustment of the second goal.

10. The environment of claim 9, wherein the physical sporting environment includes a lighting system and a sound system.

11. The environment of claim 10, wherein the means for modifying the physical sporting environment include a means for adjusting the lighting system, and a means for adjusting the sound system.

12. The environment of claim 10, wherein the means for modifying the physical sporting environment include a means for height adjustment of the first goal and a means for height adjustment of the second goal.

13. The environment of claim 10, wherein means for modifying the physical sporting environment include a means for adjusting direction and intensity of lighting from the lighting system.

14. The environment of claim 10, wherein the means for playing the physical team sport includes a means for displaying game status and rule changes.

15. The environment of claim 10, wherein the means for playing the electronic sport is one of a cell phone, a tablet, a touchscreen device, a virtual reality headset, an audio input headset, an audio input device, or a wearable device for audio or touch input.

* * * * *